United States Patent Office 3,806,400
Patented Apr. 23, 1974

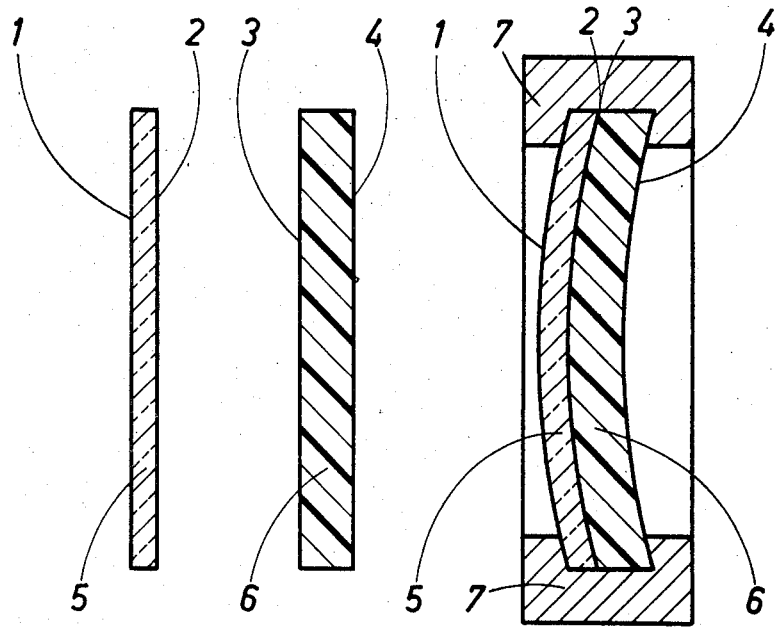
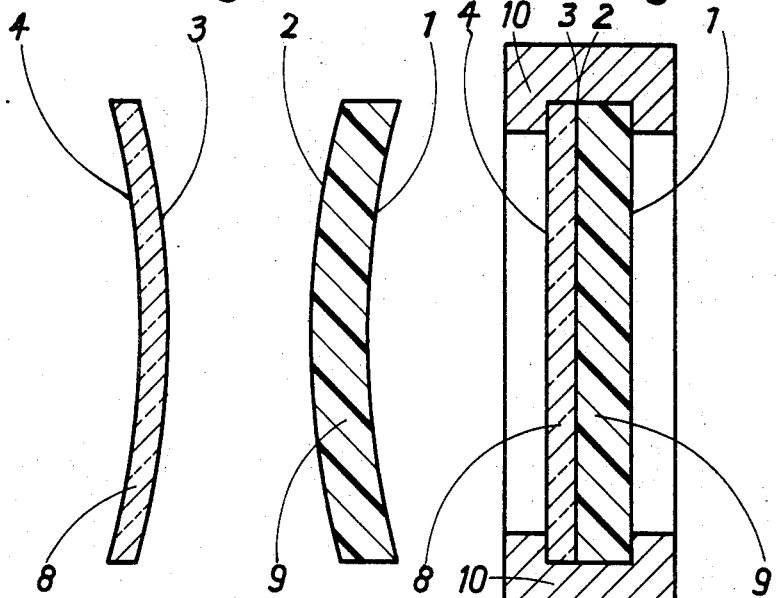

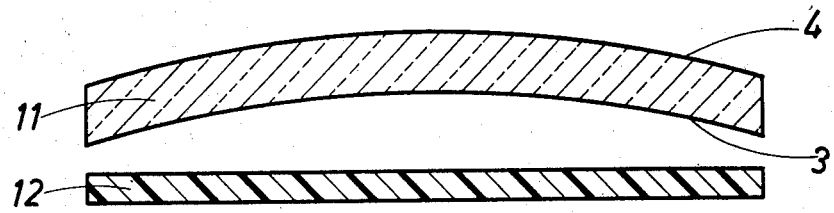
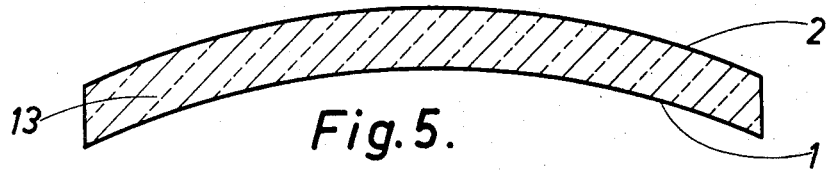
Fig. 5.
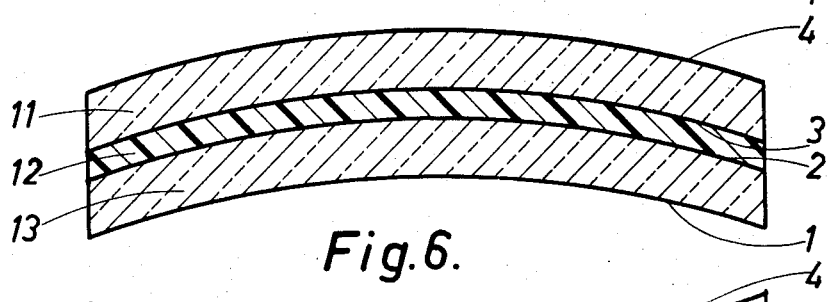
Fig. 6.
Fig. 7.
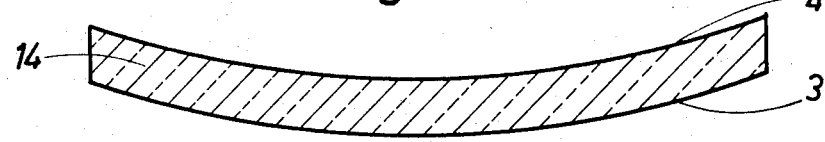
Fig. 8.

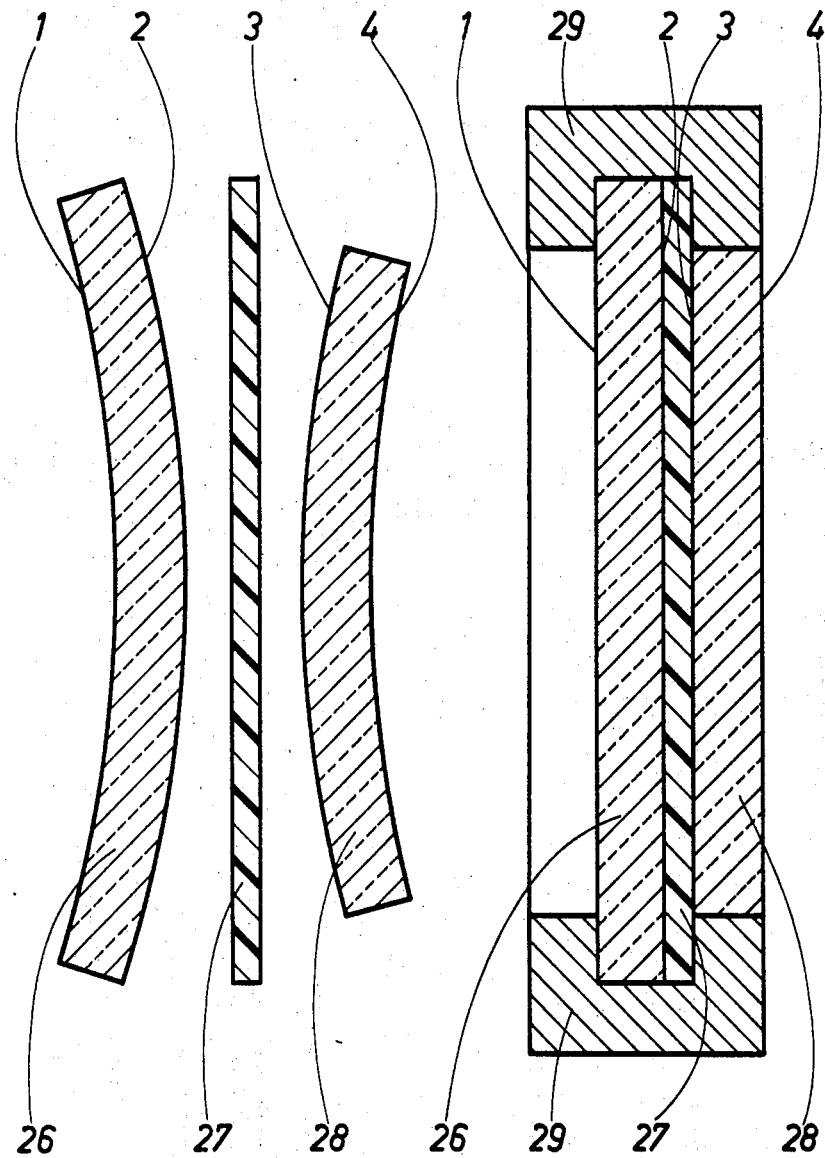

3,806,400
STRENGTHENED LAMINATED PANELS
Robert Van Laethem, Loverval, Belgium, assignor to
Glaverbel S.A., Watermael-Boitsfort, Belgium
Filed June 1, 1971, Ser. No. 148,450
Claims priority, application Great Britain, May 21, 1971, 16,286/71
Int. Cl. B32b 17/00
U.S. Cl. 161—44                54 Claims

ABSTRACT OF THE DISCLOSURE

A method of making a laminated panel from a plurality of sheets at least one of which is maintained in a state of elastic flexure to induce compressive stresses in a face of the sheet which constitutes an internal face of the panel, and a panel made by that method.

BACKGROUND OF THE INVENTION

This invention relates to panels and to a method of making a panel, particularly panels consisting of a plurality of sheets, including a sheet of glass or vitrocrystalline material, secured together to form a laminate and in which at least one sheet which is held in a state of elastic flexure. In the present specification, the term "laminate" means two sheets or more secured together by means of a frame or two sheets or more adhering together by means of one or more intervening sheets.

The term "vitrocrystalline material" as used in this specification denotes a material formed from glass by a treatment which produces one or more crystalline phases while leaving a substantial vitreous phase, therein.

When a panel incorporating a sheet of glass or vitrocrystalline material as above referred to is subjected to forces tending to flex the panel sheets, the sheet of glass or vitrocrystalline material will break if it is flexed beyond a certain limit. This limit depends on the maximum tensile forces which the sheet is capable of withstanding.

When a sheet of glass or vitrocrystalline material is flexed, one face of the sheet becomes subjected to compressive forces in the flexing operation while the other face becomes subjected to tensioning forces. The effective resistance to breakage of the sheet is therefore increased by the flexing operation only with respect to specific forces, namely forces directed so as to tend to return the sheet to its unflexed state and which therefore act to reduce the compressive stresses in that face of the sheet which has been placed under compression or increased compression by the flexing of the sheet.

SUMMARY OF THE INVENTION

It is a general object of the present invention to provide a panel incorporating a plurality of sheets, including a sheet of glass or vitrocrystalline material, secured together to form a laminate.

It is a more specific object of the present invention to provide a panel wherein at least one of the plurality of sheets is held in a state of elastic flexure such that a face thereof constituting an interval face of the laminate is held in a state of compression.

It is a related object of the present invention to provide a panel wherein at least one of the plurality of sheets is held in a state of elastic flexure by another one of the plurality of sheets.

It is still another related object of the present invention to provide a panel which includes a frame as well as a plurality of sheets and wherein at least one of the plurality of sheets is held in a state of elastic flexure by the frame.

It is yet another related object of the present invention to provide a panel which includes a frame as well as a plurality of sheets and wherein at least one of the plurality of sheets is held in a state of elastic flexure partly by the frame and partly by another one of the plurality of sheets.

These and other objects according to the invention are achieved by the method of producing a panel incorporating a sheet of glass or vitrocrystalline material to impart thereto an increased resistance to breakage under forces tending to flex the panel in one direction.

A method according to the invention of making a panel from components including a plurality of sheets, wherein at least one of the sheets is of glass or vitrocrystalline material, such sheets being secured together to form a laminate, is characterized in that the panel components are assembled so that the glass or vitrocrystalline sheet, hereafter referred to as the first sheet, is held in the panel in a state of elastic flexure, at least the face of the first sheet in which compressive stresses exist as a result of such flexure being located internally of the laminate.

In the method according to the invention, the incorporation of the first sheet in the panel in a state of elastic flexure has the important consequence that, in the panel, the first sheet has a higher effective resistance to breakage under specific forces than is presented by its inherent strength.

The assembly of the panel components in accordance with the invention is of considerable value. This value is manifest not only in the greater resistance of the first sheet to breakage by forces tending to flex the panel in one direction, but also in the reduced risk of damage to the panel sheet or sheets located at the side of said first sheet in which compressive stresses are produced by the elastic flexure of that sheet. For convenience, the side of said first sheet in which compressive stresses are produced by the elastic flexure of that sheet is hereafter referred to as the compressed face of said first sheet. It is to be understood however that the use of that expression does not imply that there are no compressive stresses in the other face of the first sheet. As will later be described, the other face may contain inherent compressive stresses due to a tempering treatment of the sheet.

The first sheet may, for example, be secured by the compressed face thereof to a sheet which could possibly be cut or ruptured in the event of the first sheet breaking under forces tending to stretch the compressed face of the first sheet. In the event of such forces being applied by a body striking the panel, breakage of the first sheet might entail complete penetration of the body through the panel.

Elastic flexure of the first sheet of course involves the application of a tensioning load on the other face of the sheet, i.e. the face which tends to be strected by the flexure. This means that the incorporation of the first sheet in the panel in the state of elastic flexure results in such sheet having a lower effective resistance to breakage by flexure due to forces tending to stretch that other face than is provided by the inherent strength of the first sheet.

This fact can in some cases contribute favorably to the properties of the panel because for certain purposes it may be desirable for the first sheet to have a high resistance to breakage due to flexing forces acting against the central portion of the panel at one face thereof, but a relatively low resistance to breakage due to flexure under forces acting against the central portion of the panel at the other face thereof.

This circumstance may apply, for example, in the case of a panel wherein the first sheet presents one exposed face of the panel and is secured by its compressed face to another component sheet which presents the other exposed face of the panel and which is intended to yield elastically in the manner of a shock-absorbing membrane or safety net to high energy impact forces against that other panel face. The relatively low resistance to breakage of the first sheet under such forces has the advantage that it has little or no inhibiting effect on the elastic flexure of such other component sheet for absorbing the shock.

For many purposes it is advantageous for the first sheet to be a naturally curved sheet which is held flat or in a state of reduced curvature. The panel can then be installed in a building or vehicle as a window glazing panel or windshield which is flat or convex towards the exterior and in which the good resistance of the first sheet to breakage is manifest with respect to flexing forces acting against the inside face of the panel, which is normally what is required.

There are circumstances however in which is is desirable for the laminate to be curved and for the good resistance of the first sheet to breakage to be manifest with respect to forces acting against the convex side of the laminate while it is peripherally supported. Accordingly, it is sometimes advantageous for the first sheet to be held elastically flexed in a curved condition such that the compressed side thereof is concave.

The elastic flexure of the first sheet may be a flexure in one plane or in a plurality of planes. Single-plane, or simple, flexure is easier to achieve and is sufficient for many purposes, but plural-plane, or complex, flexure affords the advantage that the increase in resistance to breakage is not so concentrated in one direction along the material.

An example of a simple flexure is the flexure of a flat sheet into a part-cylindrical form, i.e. a form in which the sheet conforms to part of the surface of a cylinder. An example of a complex flexure is the flexure of a flat sheet into a part-spherical form. It is emphasized however that these are only examples of the types of flexure which might be employed.

According to certain embodiments of the method according to the invention, the sheet components of the panel are assembled so that the first sheet is held in an elastically flexed state by another sheet component. This manner of holding the first sheet elastically flexed is advantageous in that it makes it unnecessary to use any component other than the sheets of the laminate for constructing the panel, or if another component is used it does not have to be of a nature such that it must resist elastic restoring forces in the first sheet.

According to other embodiments of the method according to the invention, the panel components include a frame and are assembled so that the first sheet is held in its elastically flexed state at least in part by such frame. If a frame is used for resisting the elastic recovery forces in the first sheet, the strength specifications of the other component sheet or sheets of the laminate is open to wider choice. On the other hand it is sometimes advantageous for the first sheet to be held in its elastically flexed condition in part by means of a frame and in part by means of another component sheet or sheets of the laminate. The elastic recovery forces in the first sheet are then resisted by more than one component of the panel.

Preferably, prior to assembly of the sheet components, at least one treatment is performed which produces inherent compressive stresses in external layers of the glass or vitrocrystalline material in the first sheet. Inherent compressive stresses are stresses which are not due to the exertion of any external forces on the sheet. The performance of such treatment has the important consequence of further increasing the resistance of the first sheet to breakage under flexing forces applied to the laminate. Moreover, such a treatment which produces inherent compressive surface stresses, and which is known as a tempering treatment, has the effect of favorably influencing the breakage characteristics of the sheet to reduce risk of injury to people or objects in the vicinity of the panel, or even to adjacent material of the panel itself.

Advantageously the treatment which produces inherent compressive stresses is performed so as to stress the external layers of glass or vitrocrystalline material at both sides of the first sheet substantially symmetrically relative to the sheet median plane. Symmetrical stressing can be more readily achieved in an industrial process.

The surface layers of glass or vitrocrystalline material in the first sheet can be inherently compressively stressed by subjecting the sheet to a thermal tempering treatment involving rapid cooling of the sheet after heating it to above the annealing temperature or annealing range. By thermal tempering it is possible to place the internal layers of glass or vitrocrystalline material in the sheet under very high tension so that in the event of the sheet being broken it will divide into very small fragments.

Preferably however, the surface layers of glass or vitrocrystalline material in the first sheet are inherently compressively stressed by a treatment involving diffusion of ions into one or both faces of the first sheet. By such an ion diffusion, known as a chemical tempering treatment, very high compressive surface stresses can be produced. If the sheet so tempered is broken it will divide into small blunt pieces. Moreover, the first sheet may be easily chemically tempered even if it is very thin, e.g. less than 3 mm. in thickness. In order that a chemical tempering treatment can be applied to a sheet of vitrocrystalline material there must be a sufficient proportion of a vitreous phase or phases at the surface of the sheet to permit compressive stresses to be induced as a result of a diffusion of ions into such vitreous phase or phases from a treatment medium in contact with the sheet.

Preferably a chemical tempering treatment is performed wherein ions diffuse into both faces of the first sheet. Symmetrical stressing can then be achieved easily. However, diffusion of ions into only one face of the sheet will indirectly cause compressive stresses of the external layers at the other face of the sheet.

One type of chemical tempering treatment which can be adopted, involves a replacement of ions normally present in the first sheet, e.g. sodium ions, by larger ions from a contacting medium preferably a molten medium, at a temperature low enough to prevent substantial stress relaxation to occur in the sheet during the treatment time. In this type of tempering treatment, the larger ions diffusing into the sheet may, for example, be potassium, rubidium or cesium ions.

Alternatively, such diffusion may involve a replacement of ions normally present in the glass, e.g. sodium ions, by ions deriving from a preferably molten contacting medium and conferring a lower coefficient of thermal expansion on the surface layers of the sheet, such substitution occurring at a temperature sufficiently high to permit substantial stress relaxation to occur in the sheet. In this type of chemical tempering treatment, the ions diffusing into the sheet may for example be lithium ions.

Generally speaking it is preferable for the first sheet to be located so as to present an internal face of the laminate. The assembly is simplified by securing only the compressed face of the first sheet to one or more other sheet components. The face of the first sheet providing such external face of the laminate may however be coated before or after assembly of the sheets, e.g. with a coating composition which forms an antireflection layer or otherwises modifies the optical properties of the laminate.

Preferably the first sheet is secured to only one other strength member in sheet form. This other or second sheet is secured to the compressed face of the first sheet. The assembly of two strength members in sheet form can be easily performed to produce a laminate having a required combination of properties conferred by the constituent sheets. The second sheet may if desired be coated, on its face remote from the first sheet, with a coating composition for modifying the optical properties of the panel or for some other purpose.

As in the case of the first sheet, it is preferable for the second sheet to provide an external face of the laminate. However, one or both of the sheets can be covered over on the outside by a sheet material having negligible resistance to flexure. For example, such a covering sheet may be in the form of a thin plastic foil for protective or coloring purposes.

According to certain embodiments of the invention, the first sheet is secured by its compressed face to a second strength member in sheet form, such second sheet being a sheet of plastic material. The laminate produced then has a combination of properties attributable to the different materials of the first and second sheets, which is very useful for certain purposes. A sheet of plastic can be directly bonded to the first sheet of glass or vitrocrystalline material with or without an intervening bonding layer.

Particular importance is attached to embodiments of the invention in which the first sheet of glass or vitrocrystalline material is secured by its compressed face to a second strength member in sheet form, the second sheet also being a sheet of glass or vitrocrystalline material. Panels of this type are very suitable for use as glazing panels in buildings and vehicles, and particularly as vehicle windshields. The second sheet is proferably one which has been tempered to give it the ability to divide into small fragments in the event of breakage. In the particularly preferred embodiments, the second sheet is one which has been chemically tempered, affording the advantage that if the sheet breaks it divides into small blunt pieces which involve little risk of personal injury by laceration. The chemical tempering may be performed according to any of the chemical tempering processes hereinbefore described in relation to the treatment of the first sheet.

In one of the preferred embodiments of the invention, wherein the first sheet is secured by its compressed face to a second sheet of glass or vitrocrystalline material, the first sheet can, in the completed panel, be flexed to impose flexing forces on the second sheet sufficient to break that sheet. The panel then has very advantageous strength characteristics. In particular, the good resistance of the first sheet to breakage under flexing forces applied against the first sheet of the laminate while it is peripherally supported, is utilized by enabling the first sheet to flex under such forces without restraint by the second sheet when a given flexing load against the first sheet is exceeded. This is of importance for example for avoiding concussive injury to a person who may make impact with the panel, e.g. in the case that it is used as a vehicle windshield with the first sheet facing the vehicle interior.

In optimum forms of such embodiments, the relative resistances of the first and second sheet, considered independently of each other, to breakage by flexure are such that the resistance of the second sheet to breakage due to a flexure which imposes tensioning forces on the other face thereof, i.e. the face which in the completed panel is remote from the first sheet, is higher than the resistance of the first sheet to breakage due to a flexure which imposes tensioning forces on the inner face of that sheet, i.e. the face which in the completed panel faces the second sheet.

This condition is not inconsistent with the condition that, in the completed panel, the second sheet should break under flexing forces, imposed against the first sheet, of a magnitude insufficient to break the first sheet, because in the completed panel the component sheets behave as a monolithic structure up to the moment of breakage of the second sheet and under any given flexing force applied against the central part of the first sheet while the laminate is peripherally supported, the outer face of the second sheet tends to be subjected to a higher tractive force than the inner face of the first sheet.

Moreover, as in the completed panel the inner face of the first sheet is compressed due to such sheet being held in an elastically flexed state, the tractive forces on that inner face do not begin to place that face in tension until the compressive stresses therein due to the elastic flexure have been overcome. The advantage of giving the second sheet the higher breakage resistance is that when the panel is used as a glazing panel, e.g. as a windshield or in a door, the second sheet is capable of absorbing a higher proportion of impact energies before it breaks.

The relative breakage resistance of the first and second sheets with respect to the above described forces can be attained by selecting the second sheet of appropriately greater thickness than the first sheet. This is particularly advantageous if the second sheet has been tempered, preferably chemically, because the second sheet can have very good resistance to breakage by the impact of small hard objects such as stones while the first sheet is thin enough to have a desired flexibility to assist in shock absorption. Alternatively, if in order to keep the weight of the panel below a certain value, or for other reasons, the thickness of the second sheet must be below the value which would be necessary, apart from other factors, for attaining the higher breakage resistance, the latter can be attained by means of chemical tempering or by a combination of such treatment and an appropriate selection of the thickness of the sheet.

In embodiments of the invention wherein the first sheet is secured by its compressed face to a second strength member in sheet form and of glass or vitrocrystalline material it is in some cases advantageous for the panel components to be assembled so that the second sheet is itself held elastically flexed, e.g. by means of a frame component and/or by means of the first sheet. The second sheet can, for example, be held in an elastically flexed condition such that its outer face is in tension. Alternatively, in the case where the second sheet contains inherent compressive surface stresses due to a tempering treatment, the second sheet can be held elastically flexed so that its outer face is in a state of reduced compression. In either case, the advantage is achieved that the flexing load at which the second sheet will break is lowered.

Advantageously, the first sheet is secured to a second sheet of glass or vitrocrystalline material by means of an intervening organic sheet or sheets. The first and second sheets can be directly secured to an intervening sheet, e.g. by application of heat and pressure, or the first and second sheets may be secured to the intervening sheet by means of bonding layers, e.g. layers of adhesive applied in liquid or paste form between the first and second sheets and the intervening sheet.

The intervening sheet may, e.g., be a sheet of organic polymeric material such as a sheet of polyvinyl butyral or polyvinyl chloride or a high molecular weight polycarbonate of a bisphenol which may be bonded by means of polyvinylacrylate adhesive to the sheets between which it is sandwiched. This way of securing the first and second sheets together enables a very satisfactory bond to be achieved. An intervening sheet can serve to hold individual pieces of the first and second sheets in the event of breakage thereof, and a stable assembly of the two main sheets can be readily produced. Also, the panel can have a very good transparency and other advantageous optical properties, such as a low optical distortion.

An intervening organic sheet for securing the first and second sheets together is preferably one which can serve as a safety net in the event that the first sheet becomes broken by the impact of a body against such sheet. Particularly in cases in which at least the first sheet is tempered, the panel then has very good properties for use as a glazing panel in situations where there is a risk of breakage of one or both sheets due to impact of a person against the panel. Moreover, due to the fact that the first sheet is held in the panel in a state of elastic flexure such that the face of that sheet next to the intermediate organic sheet is compressed, the risk of the panel being penetrated by a body, e.g. the head of a passenger in the case that the panel is used as a windshield, under high impact energies, is considerably reduced. If impact occurs against the first sheet, such sheet can cause breakage of the intermediate organic sheet to commence only at higher impact energies than in the case of laminates in which the inner sheet is not held in a said state of elastic flexure. As hereinbefore referred to, the first sheet is preferably chemically tempered to promote the formation of small blunt pieces in the event of breakage thereof.

According to certain embodiments of the invention, before and/or during assembly of the panel components, the first sheet of glass or vitrocrystalline material is given a resistance to breakage under flexing forces tending to stretch the face thereof which in the completed panel is compressed by flexure, such that a sample sheet measuring 30 cm. in each of its length and breadth dimensions but otherwise with the first sheet, when supported at the periphery of that face, in a horizontal position, will not break under the impact, of a steel ball weighing 227 g. dropped from a height of $(1.5+0.95t)$ meters, where $t$ is the thickness of the sheet in mm. The resistance to breakage by flexure may be imparted merely by holding the first sheet in a sufficiently elastically flexed condition, or by a combination of that step and a tempering treatment. Tests have shown that if a panel incorporating a first sheet having such a strength specification is used as a windshield with the first sheet facing the interior of the vehicle, the risk of dangerous or fatal injury to an occupant of the vehicle by laceration, in the event of impact against the windshield is significantly reduced.

However, as vehicle speeds are tending to increase, with the consequential risk of more violent impacts, it is still more advantageous for the resistance to breakage of the first sheet to be even higher, so that according to particularly important embodiments of the invention, the first sheet is given a resistance to breakage under said flexing forces such that a sample sheet measuring 30 cm. in each of its length and breadth dimensions but otherwise identical with the first sheet when subjected to such strength test, will not break under the impact of the above-described ball when it is dropped from a height of 3.4 meters.

The present invention includes any panel made by a method according to the invention as hereinbefore described.

The invention also includes any panel incorporating a plurality of sheets, including a sheet of glass or vitrocrystalline material, such sheets being secured together to form a laminate, characterized in that the sheet of glass or vitrocrystalline material, hereafter referred to as the first sheet, is held in the panel in a state of elastic flexure, at least the face of the first sheet in which compressive stresses exist as a result of such flexure being located internally of the laminate.

The advantage of such a panel can be appreciated from the earlier description of panels produced by methods according to the invention, and particularly relates to the relatively high resistance of the first sheet to breakage in the event that the laminate is subjected to flexing forces tending to stretch the face of the first sheet in which there are compressive stresses resulting from such flexure. The face of the first sheet in which there are compressive stresses is hereafter referred to as the compressed face thereof.

For certain purposes it is an advantage for the compressed face of the first sheet to be flat or convex in the flexed condition of such sheet. In other cases it is preferable for the compressed face of the first sheet to be concave in the flexed condition of such sheet. The particular advantages attaching to these and various other optional features of the panel hereinafter referred to are implicit in the statements made earlier in this specification concerning the advantages afforded by the corresponding method features.

The first sheet is in certain embodiments of the invention held elastically flexed in a plurality of planes. In other embodiments of the invention said first sheet is held elastically flexed in a single plane.

Advantageously, the first sheet is held in an elastically flexed state by a second component sheet of the panel.

A panel according to the invention can however incorporate a frame if so desired and in that case the first sheet can be held in an elastically flexed state by such frame or in part by such frame and in part by a second component sheet of the panel.

It is beneficial for the first sheet to contain inherent compressive stresses in external layers of the glass or vitrocrystalline material thereof. Such compressive stresses can be produced by a thermal tempering treatment but they are preferably produced by a chemical tempering treatment. The inherent compressive stress pattern is preferably symmetrical over the thickness of the sheet.

Preferably the first sheet provides an external face of the laminate. Such face can bear a surface coating, e.g. an anti-reflection coating layer or an optical coating of some other type.

Preferred panels according to the invention incorporate the first sheet and only one other strength member in sheet form, with the second sheet being secured to the compressed face of the first sheet. It is preferred for the second sheet to provide an external face of the laminate. As in the case of the first sheet, the external face of the second sheet may bear a surface coating.

Although it is preferable for the first and second sheets to provide external faces of the laminate, one or each of them can according to certain embodiments of the invention be covered by another sheet and in particular a sheet which is not a strength member, i.e. a sheet having negligible resistance to flexure such as a thin plastic foil.

Panels of simple form according to the invention include a laminate in which the first sheet of glass or vitrocrystalline material is secured by its compressed face to a second strength member in sheet form, such second sheet being a sheet of plastic material.

In the most preferred forms of the panel according to the invention, the first sheet of glass or vitrocrystalline material is secured by its compressed face to a second strength member in sheet form, the second sheet also being of glass or vitrocrystalline material. Preferably the second sheet is one which has been tempered, and preferably chemically tempered.

Panels of particular importance are composed of the first sheet secured by its compressed face to a second sheet of glass or vitrocrystalline material so that the first sheet can be fixed to impose flexing forces on the second sheet sufficient to break that sheet.

It is an advantage if the relative resistances of the first and second sheets, considered inedependently of each other, to breakage due to flexure are such that the resistance of the second sheet to breakage due to a flexure which imposes tensioning forces on the face thereof which, in the completed panel, is remote from the first sheet is higher than the resistance of the first sheet to breakage due to a flexure which imposes tensioning forces on the compressed face of that sheet. The second sheet is preferably a chemically tempered sheet which is thicker than the first sheet.

According to an advantageous feature, in a panel as aforesaid incorporating a second sheet of glass or vitrocrystalline material, the second sheet is held in the panel in a state of elastic flexure, e.g. by means of a frame and/or by means of the first sheet. For many purposes it is particularly beneficial for the second sheet to be held elastically flexed in a direction such that its face facing away from the first sheet is in tension. Alternatively, in the case that the second sheet contains inherent compressive surface stresses, it may be held elastically flexed so that its face facing away from the first sheet is in a state of reduced compression.

Special importance is attached to panels according to the invention wherein the first sheet is secured by its compressed face to a second sheet of glass or vitrocrystalline material by means of an intervening organic sheet or sheets. The intervening sheet may include a sheet of thermoplastic, e.g. a sheet of high impact polyvinyl butyral of controlled adherence, or a high molecular weight polycarbonate of a bis-phenol which may be secured to the first and second sheets by means of a polyacrylate or polyvinyl chloride adhesive.

According to a further optional but valuable feature, a panel according to the invention incorporates a second sheet of glass or vitrocrystalline material which is thicker than the first sheet and the first sheet has a thickness in the range of 1.0 to 2.5 mm. whereas the second sheet has a thickness in the range of 1.5 to 4.0 mm. Such panels are particularly valuable as glazing panels, e.g., in a building or a vehicle.

Particularly with a view to use of a panel according to the invention as a glazing panel in a building or vehicle, it is advantageous for the first sheet of glass or vitro-crystalline material to have a resistance to breakage under flexing forces tending to stretch the compressed face thereof such that a sample sheet measuring 30 cm. in each of its length and breadth dimensions but otherwise identical, with the first sheet when supported at the periphery of the compressed face in a horizontal position, will not break under the impact of a steel ball weighing 227 g. dropped from a height of $(1.5+0.95t)$ meters, where $t$ is the thickness of the sheet in millimeters. It is still more advantageous for the first sheet to have a resistance to breakage under such flexing forces such that a sample sheet measuring 30 cm. in each of its length and breadth dimensions but otherwise identical, with the first sheet when subjected to such strength test, will not break under the impact of such ball when it is dropped from a height of 3.4 meters.

BRIEF DESCRIPTION OF THE DRAWINGS

FIG. 1 is a cross-sectional view of the components of one embodiment of a panel according to the invention.

FIG. 2 is a cross-sectional view of the embodiment of a panel according to the invention formed from the components illustrated in FIG. 1.

FIG. 3 is a view similar to that of FIG. 1 of the components of an embodiment of a duplex type panel according to the invention.

FIG. 4 is a view similar to that of FIG. 2 of the embodiment of a panel according to the invention made from the components of FIG. 3.

FIG. 5 is a cross-sectional view of the components of one embodiment of a triplex type panel according to the invention.

FIG. 6 is a cross-sectional view of the embodiment of a panel according to the invention formed from the components of FIG. 5.

FIG. 7 is a cross-sectional view of the components of another embodiment of a panel according to the invention.

FIG. 8 is a cross-sectional view of the embodiment of a panel according to the invention formed from the components of FIG. 7.

FIG. 14 is a cross-sectional view of the components of a further embodiment of a panel according to the invention.

FIG. 15 is a cross-sectional view of the embodiment of a panel according to the invention made from the components of FIG. 14.

DESCRIPTION OF THE PREFERRED EMBODIMENTS

Figure 9:
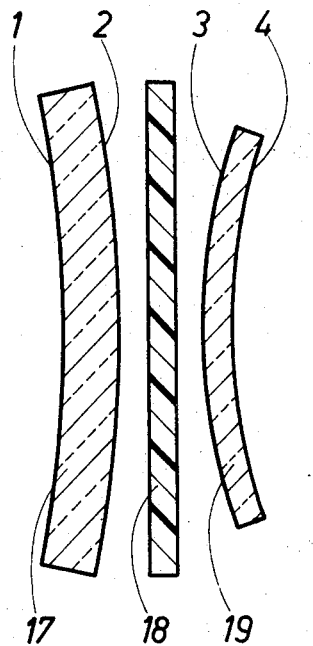
FIG. 9 is a cross-sectional view of the components of another embodiment of a panel according to the invention.

In the drawing figures with respect to which the following detailed description will be given, the reference numerals 1, 2, 3 and 4 are utilized to designate respective faces of the components of the various embodiments of the invention. The illustrated embodiments will be described with reference to a series of specific examples. All of the embodiments of the invention are multilayer articles having a flat or curved configuration and generally constitute door or window panels, or vehicle windshields. Therefore, reference throughout the following description to panels or windshields is to be construed as a reference to such multilayer articles.

Example 1

One embodiment of a panel having the form illustrated in FIGS. 1 and 2 is constituted essentially of a glass sheet 5 measuring 1 m. x 1 m. x 1.5 mm. and an acrylic plastic sheet 6 measuring 1 m. x 1 m. x 6 mm. Before these sheets were assembled together, they had the planar configuration shown in FIG. 1.

One series of sheets 5 intended to be utilized in forming the panels illustrated in FIG. 2, were preliminarily strengthened by immersion for 20 minutes in a bath containing, by weight, 2% $LiNO_3$ and 98% $NaCl$, the bath being maintained at a temperature of 580° C. After this treatment, each treated sheet 5 was joined to a sheet 6 by means of a metallic frame 7, with the sheets 5 and 6 being disposed directly against one another and being held by the frame 7 in the flexed condition illustrated in FIG. 2 in such a manner as to cause this flexure to induce compressive stresses in the face 2 of sheet 5 and in the face 4 of plastic sheet 6. The sheets 5 and 6 were flexed to an extent that the rise of each sheet was 60 mm., the rise being the displacement of the center of the sheet from the plane defined by its exposed edges which extend normally to its line of curvature, in this case its top and bottom edges.

The resulting panels are intended to be utilized as anti-explosion panels and to be mounted in such a manner that glass sheet 5 is disposed toward the interior of its associated enclosure. When the panel is disposed in that manner, the compression stresses induced in faces 2 and 4 causes the quantity of energy, generated by an explosion within the enclosure, necessary to break sheet 5 to be greater than that required in the case of a panel identical with that illustrated in FIG. 2 except that its component sheets are not flexed.

In addition, in the case of the embodiment illustrated in FIG. 2, when an explosion develops sufficient energy to break sheet 5, plastic sheet 6 will serve as a protective net capable of retaining the glass fragments and thus preventing these fragments from being projected in all directions.

For fabricating a modified version of the arrangement illustrated in FIG. 2, the sheet 6 was covered with a thin sheet (not shown) of tinted plastic permitting a filtration of a portion of the radiation incident on sheet 6. The tinted plastic sheet can be disposed between sheets 5 and 6 and be gripped between these sheets by means of the frame 7. In addition, in this modified form of construction, the sheets 5 and 6 are held by frame 7 in a configuration in which they are flexed in two mutually perpendicular directions, which permits an increase in the strength of the faces 2 and 4 in these two directions.

According to another modified form of construction, the sheet 5 can be tinted so as to filter the radiation incident on sheet 6.

Finally, according to a further modification, the sheets 5 and 6 held against one another by means of frame 7 were also cemented to one another by means of a sheet of polyvinyl chloride or a sheet of polyvinyl butyral, which permitted the coherence of the overall panel to be increased.

Example 2

Panels having the form illustrated in FIG. 4 were fabricated from sheets having the initial form illustrated in FIG. 3. This panel is composed essentially of a glass sheet 8 having a thickness of 2 mm. and having the following composition, by weight:

| | Percent |
|---|---|
| $SiO_2$ | 61 |
| $Al_2O_3$ | 18 |
| $Na_2O$ | 11.8 |
| $K_2O$ | 3.7 |
| $Ti_2O$ | 2 |
| MgO | 2.6 |
| CaO | 0.4 |
| $As_2O_3$ | 0.5 | and of a sheet 9 of stretched acrylic plastic having a thickness of 23 mm. Those sheets 8 and 9 were 0.5 m. square. The panel of FIG. 4 is intended to be utilized as an airplane window and to be mounted in such a manner that the face 4 of sheet 8 is disposed toward the exterior of the craft. Before assembly of a series of panels in a metallic frame 10, a series of sheets 8 were subjected to the following treatment:

(a) Sheets 8 were heated to a temperature at which the viscosity of their glas material was of the order of $10^8$ poises in a manner to permit the sheets to be easily bent into a simple curved configuration and to permit a rapid relaxation of the stresses induced by this bending. After this type of bending, the sheets 8 had a curvature whose rise was 50 mm.;

(b) After bending, the sheets 8 were strengthened by a chemical tempering which was carried out by immersing them for 24 hours in a bath composed of, by weight, 40% $KNO_3$, 30% KCl and 30% $NaNO_3$, the bath being maintained at 450° C.;

(c) After withdrawal of the sheets from the bath, they were washed and dried and each resulting sheet 8 was assembled with a sheet 9 in frame 10 in such a manner as to unbend each sheet 8 and thus to return it to a planar form for the purpose of inducing complementary compressive stresses in its face 3, and to produce an essentially flat panel having the form illustrated in FIG. 4.

Flexure strength tests carried out on such panels revealed that the compressive stresses induced by the chemical tempering of sheet 8 were of the order of 90 kg./mm.² while the stresses induced by the unbending of sheet 8 during operation (c) above, were of the order of 14 kg./mm.², which resulted in a rupture stress at the face 4 of the order of 110 kg./mm.².

It should be noted that, advantageously, sheets 9 were also bent before assembly to give them the natural curvature illustrated in FIG. 3 so that the resulting unbending of sheets 9 in the assembled panels served to induce compressive stresses into the face 2 of each sheet 9.

It was determined that aircraft windows produced as described above presented an improved resistance to impact by objects, such as birds, against face 4.

According to a modified version of the procedure described above in the present example, each sheet 9 was composed of two acrylic plastic sub-sheets joined together by means of a 1 mm. thick polyvinyl butyral sheet and it was noted that panels containing a sheet of this type presented an improved resistance to impact by objects against face 4 compared with that of known panels.

According to another modified form of construction, the sheets 9 were formed from an acrylic plastic sheet having a thickness of 18 mm. and joined by means of a 1 mm. thick polyvinyl butyral sheet to an acrylic plastic sheet having a thickness of 23 mm., the acrylic plastic sheets having the initial configurations of the sheet 9 illustrated in FIG. 3 and the 23 mm. thick sheet presenting an external face of the resulting panels.

Example 3

A windshield having the form illustrated in FIG. 6 was assembled from two essentially identical sheets 11 and 13, each of a soda-lime glass having the following composition, by weight:

| | Percent |
|---|---|
| $SiO_2$ | 70 |
| $Na_2O$ | 15 |
| CaO | 9 |
| MgO | 0.6 |
| $Al_2O_3$ | 3.7 |
| $Na_2SO_4$ | 0.7 | the remainder being impurities or small amounts of other compounds.

Each of these sheets measured 0.5 m. x 1 m. x 2 mm. After each sheet 11 was joined to a sheet 13 by means of a 0.76 mm. thick sheet 12 of high impact polyvinyl butyral, the resulting windshields were intended to be mounted in such a manner that the face 4 of sheet 11 would be directed toward the exterior of the automobile.

Before assembly of the windshields, sheets 11 and 13 were treated in the following manner:

(a) A group of sheets 11 were heated to a temperature at which the viscosity of their glass material was of the order of $10^8$ poises to permit these sheets to be easily bent and to permit a rapid relaxation of stresses induced therein by bending. The sheets were bent to have a simple curvature, i.e. a curvature with respect to but a single plane, this curvature being in the direction of their long dimension, that is the dimension along which they measure 1 m., and being such as to give them a rise of 10 mm.;

(b) A group of sheets 13 were also heated to a temperature at which the viscosity of their glass material was of the order of $10^8$ poises to permit these sheets to be easily bent and to permit a rapid relaxation of the stresses induced by this bending. Sheets 13 were also bent to have a simple curvature in the direction of their long dimension and by an amount such as to give these sheets a rise of 70 mm.;

(c) The groups of bent sheets 11 and 13 were then subjected to a chemical tempering ion diffusion strengthening treatment by immersing them for 24 hours in a bath of $KNO_3$ maintained at 460° C.

After the sheets were withdrawn from the bath and washed and dried, each sheet 11 was assembled with a sheet 13 by means of the above-described sheets 12 to form the windshield illustrated in FIG. 6. The joining together of sheets 11 and 13 into a laminate caused the curvature of sheet 13 to be reduced and the curvature of sheet 11 to be increased to such a degree that in the resulting assembly both sheets had the same curvature, which was such that their rise was 40 mm.

Impact tests were conducted on a number of panels produced as above described with reference to FIGS. 5 and 6 in comparison with a number of conventional panels formed from identical components with the sole exception that the two glass sheets had the same natural curvature and were therefore not subjected to elastic flexure in the course of lamination. These tests involved peripherally supporting each of the panels and subjecting it to flexing forces imposed by the impact of a rounded body against the central portion of its concave side. The conventional panels were tested first to determine the minimum impact force at which the glass sheet providing the concave panel face would break. The panels made according to the invention were then subjected to impact forces of that order of magnitude. In every case, sheet 13 remained unbroken and it was found in fact that the sheet 13 could even withstand appreciably higher impact forces without breaking although the sheet 11 was broken. The fact that sheet 11 broke was in part attributable to the fact that during the production of the laminate, face 4 of that sheet was subjected to tensile loading during the elastic flexure of the sheet, with the result that the compressive stressed which had been produced at that side of the chemical tempering were reduced to a lower value. In addition, a given flexure of a laminate of the kind in question, under impact force acting against the glass sheet 13, does not impose on the convex side of that sheet such high tensile loading as that which is imposed on the convex side of the glass sheet 11.

In a variant embodiment, a number of panels were produced as described with reference to FIGS. 5 and 6 with the exception that the glass sheets had a thickness of 3 mm. and were thermally rather than chemically tempered. The sheets were thermally tempered by uniformly heating them up to a temperature close to the softening point of the glass and then rapidly cooling them. It might be noted that in his modificaion of procedure the sheets in fact do have a thickness different from that mentioned in the first part of Example 3 because it is very difficult to apply a thermal tempering on sheets having a thickness less than 3 mm. The completed panels were subjected to strength tests of the kind above referred to, in comparison with conventional panels made in the same way from identical components except that the two glass sheets of each panel had the same natural curvature and were therefore not subjected to elastic flexure during lamination. The panels produced according to the invention were found to be much stronger, in the sense that the flexing force which it was necessary to exert against the concave side of the panels in order to break the glass sheet at that side of the laminate was appreciably higher in the case of the panels made according to the invention than in the case of the conventional panels.

Example 4

A panel was made from components represented in FIG. 7 the final form of the panel being as shown in FIG. 8. The components from which the panel was made comprised two sheets 14, 16 of a soda-lime glass having the following general composition by weight:

| | Percent |
|---|---|
| $SiO_2$ | 75 |
| $Na_2O$ | 12 |
| CaO | 10 |
| $Al_2O_3$ | 2 | the remainder comprising minor amounts of impurities, and a sheet 15 of "high impact" polyvinyl butyral 0.76 mm. in thickness. The two glass sheets measured 1 m. x 0.5 m. x 0.002 m.

The sheets 14 and 16 were bent to the illustrated curvature at a temperature at which the viscosity of the glass was of the order of $10^8$ poises, this viscosity being sufficiently low to ensure rapid relaxation of any stresses induced in the glass during the bending operation. The two sheets were bent to the same extent, corresponding with a displacement of the center of the sheet of 120 mm. relative to its shorter edges.

The sheets 14 and 16 were then chemically tempered by immersing them for 24 hours in a bath of molten potassium nitrate maintained at 460° C.

After cooling the sheets, they were washed and dried and were assembled on opposite sides of the sheet 15 of polyvinyl butyral as shown in FIG. 7, with the convex sides of the glass sheets facing the polyvinyl butyral sheet. The assembly of sheets was then subjected to heat and pressure in order to bond the glass sheets together by means of the intervening plastics sheet and produce the panel shown in FIG. 8. The laminating step thus involved elastic flexure of the glass sheets so as to produce additional compressive stresses at the side of face 3 of sheet 14 and at the side of face 2 of sheet 16. In the completed panel, each of the glass sheets was held in its elastically flexed condition by the elastic recovery forces in the other sheet.

By virtue of the way in which the glass sheets were held elastically flexed in the panel, each of the glass sheets had a high resistance to breakage under flexing forces imposed against the corresponding side of the panel. This was confirmed by impact tests of the kind described in Example 3, which were performed on a number of panels produced as described with reference to FIGS. 7 and 8. The panels were divided into different batches. The sheets of one batch were subjected to flexure by impact forces imposed by a body striking face 1 of sheet 16 and the sheets of the other batch were subjected to flexure by impact forces imposed by a body striking face 4 of sheet 14. In each test, the glass sheet against which the body actually made impact was able to yield by flexure and without breaking, so acting as a kind of shock absorber, even under impact forces which were sufficient to cause breakage of the glass sheet at the other side of the panel.

The aforesaid strength properties of panels produced as described with reference to FIGS. 7 and 8 are of potential importance for glazing panels to be used as vehicle windscreens. In the event of the driver or a passenger being thrown forward against the inside of the windscreen the ability of the inner sheet of the screen to undergo appreciable outward flexure without becoming broken is very important because it reduces the number of accident fatalities due to the head of a vehicle occupant penetrating through the windscreen or due to the vehicle occupant being thrown completely through the screen. In fact due to the employment of the invention in the manufacture of the panels according to FIGS. 7 and 8, the quantity of impact energy necessary in order to cause a rounded body to penetrate through the intervening sheet of polyvinyl butyral proved to be very high and certainly much higher than the impact energy which would be necessary to cause penetration of this intersheet had the panels being produced without creating compressive stresses in at least one of the glass sheets (the glass sheet to be exposed to the impact) by elastic flexure thereof. In the panels thus produced according to the invention, the plastics intersheet could therefore play a much more important role as a protective membrane or safety net.

A batch of panels produced as described with reference to FIGS. 7 and 8 were tested by peripherally supporting each panel in a horizontal position and subjecting the panel to the impact of a rounded body weighing 10 kg. and simulating a human head, which body was allowed to fall under gravity onto the central portion of the panel from a height of 620 cm. Twenty panels were subjected to this test and in each case the plastics intersheet was not penetrated. The said intersheet was not even cut or ruptured.

It is to be noted that in the lamination of the sheets to produce the panel shown in FIG. 8, faces 1 and 4 of the sheets 16 and 14 respectively were subjected to tensile loading. For certain purposes, it is important that such sheets do not have a very high resistance to breakage by flexure in a direction which tends to stretch face 1 or face 4 as the case may be. For example in the case of a vehicle windscreen, it is sometimes advantageous to ensure that the outer glass sheet (i.e. the glass sheet which is on the outside of the vehicle) will break under the impact of a body against the inside of the windscreen before the impact force reaches a value at which serious internal head injury is probable. Once the outer glass sheet has broken, the inner glass sheet can continue to flex more easily. The extent to which the outer sheet of glass can be outwardly flexed before breaking depends in part on the extent of its natural curvature because this determines the extent to which its external face (face 1 or 4) is "stretched" during the laminating step. In the case of the panels made according to FIGS. 7 and 8 as above described, the degree of natural curvature of sheet 14 or 16 was such that the maximum tensile loading which its outer face (face 1 or 4) could withstand by flexure of the sheet was equal to or less than 50 kg./mm.².

A series of further tests was carried out on sample pieces of glass measuring 30 cm. x 30 cm. x 2 mm. and having the same composition as the glass sheets 14 and 16. The sample pieces were bent to a curvature comparable to the curvature of the sheets 14 and 16, using the same bending technique as in the bending of those sheets, and the sample pieces were chemically tempered in the same way as the sheets 14 and 16. Each sample was then peripherally hed in a flat condition and subjected to the impact of a steel ball weighing 227 g. which was dropped from a height of 3.5 meters onto the side of the sample which had been stretched by its elastic flexure (corresponding with side 1 of sheet 16 and side 4 of sheet 14). None of the samples broke under the impact.

In a variant embodiment, some windscreens were produced as described with reference to FIGS. 7 and 8, but using glass sheets 14 and 16 of different thickness and bent to curvatures of different radii. In these other windscreens, sheet 14 had a thickness of 2 mm. while sheet 16 had a thickness of 1.5 mm. and the extents of their natural curvatures, expressed in terms of the displacement of the centre of the sheet relative to its shorter edges, were such that the said displacement was in the case of the thicker sheets (sheets 14) 120 mm. and in the case of the thinner sheets (sheet 16) 158 mm. Apart from the thickness of sheet 14 and its greater natural curvature, the sheet components were the same as the sheet components already described with reference to FIG. 7, and were chemically tempered in the same way as those sheets prior to lamination. The sheets in this variant embodiment were assembled and laminated to form a flat windscreen in the same way as the sheets shown in FIG. 7. The resulting panels were intended to be installed as windscreens with the thinner glass sheet facing the interior of the vehicle. The thinner glass sheet of each of the panels so produced had a very high flexibility under impact forces against its exposed face (face 1). The panels were subjected to impact tests of the kind above referred to using a rounded body weighing 10 kg., simulating a human head, which was allowed to fall onto face 1 of the windscreens while they were peripherally supported. The windscreens were able to withstand very high impact forces without any penetration or cutting of the plastics intersheet occurring. Such high impact forces were certainly substantially higher than those which would cause penetration or cutting of the plastics intersheet of known "Triplex" windscreens incorporating sheets of chemically tempered glass.

A further batch of panels was produced as described with reference to FIGS. 7 and 8 but using glass sheets 14 and 16 each of which had a natural curvature not only along its longitudinal axis but also along its transverse axis. The glass sheets were chemically tempered and were laminated to produce a flat panel so that in the course of lamination compressive stresses were produced in the normally convex sides of the two glass sheets due to the elastic flexure thereof. By virtue of such elastic flexure, each of the glass sheets had, in the completed panel, a very high resistance to breakage under flexing forces imposed against the central part of such sheet and tending to flex the panel.

Example 5

Figure 11:
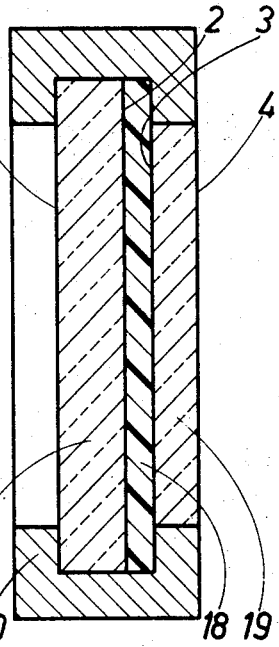
FIG. 11 is a cross-sectional view of the completed embodiment of the panel illustrated in FIG. 10.

Panels having the form illustrated in FIG. 11 were assembled from two sheets 17 and 19 made of a glass having the following composition, by weight:

|  | Percent |
|---|---|
| $SiO_2$ | 70 |
| $Na_2O$ | 16.3 |
| CaO | 11 |
| MgO | 0.6 |
| $Al_2O_3$ | 1.4 |
| $Na_2SO_4$ | 0.7 |

Figure 10:
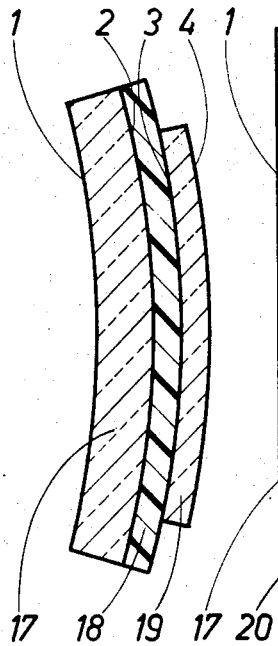
FIG. 10 is a cross-sectional view of the embodiment of a panel according to the invention formed from the components of FIG. 9, at an intermediate stage of the fabrication of such panel.

Sheet 17 measured 0.5 m. x 0.5 m. x 13 mm., while sheet 19 measured 0.4 m. x 0.4 m. x 2.8 mm. Each sheet 17 was joined to a sheet 19 by means of a 0.8 mm. thick sheet 18 of polyvinyl butyral and a metallic frame 20. Before assembly of the panels, the sheets 17 and 19 were subjected to the following treatments:

(a) Sheets 17 and 19 were heated to a temperature at which the viscosity of their glass material was of the order of $10^8$ poises to permit them to be easily bent while permitting a rapid relaxation of the stresses induced by such bending. The sheets were then bent to have a smiple curvature such that they each had a rise of 30 mm.;

(b) After bending, sheets 17 and 19 were subjected to a chemical tempering strengthening operation by immersing them for 24 hours in a bath maintained at 460° C. and containing by weight, 40% $KNO_3$, 30% KCl and 30% $NaNO_3$;

(c) After removal from the bath, washing and drying, the sheets 17 and 19 had the form illustrated in FIG. 9. Each sheet 17 was then joined to a sheet 19 by means of a 0.8 mm. thick sheet 18 of polyvinyl butyral and a frame 20 to form the assembly illustrated in FIG. 11. The fabrication of this assembly was performed in the following specific manner:

(1) First, each sheet 17 was joined to a sheet 19 by means of a polyvinyl butyral sheet 18 by first disposing the sheets relative to one another in the manner illustrated in FIG. 9 and then bonding them together to form the arrangement illustrated in FIG. 10, wherein the sheet 17 retains essentially its natural curvature;

(2) Then this assembly of sheets 17, 18 and 19 was flexed to give it a planar configuration, as shown in FIG. 11, this serving to induce compressive stresses in faces 2 and 3 of the assembly. The resulting laminated assembly of sheets 17, 18 and 19 was thereafter maintained in this planar configuration by the metal frame 20. Frame 20 could be, according to an embodiment not illustrated in the drawings, composed of a metal part and a plastic part, or could be composed of other materials such as wood.

By virtue of the compressive stresses present in sheet 17 due to its elastic flexure, this sheet had, in the completed panel, a high resistance to breakage under forces acting against the sheet and tending to flex the panel. The panel was very well suited for use as a spy-window in the cabin of a vehicle or in the crew cabin of an aircraft with the glass sheet 17 located on the inside of the window.

EXAMPLE 6

Figure 12:
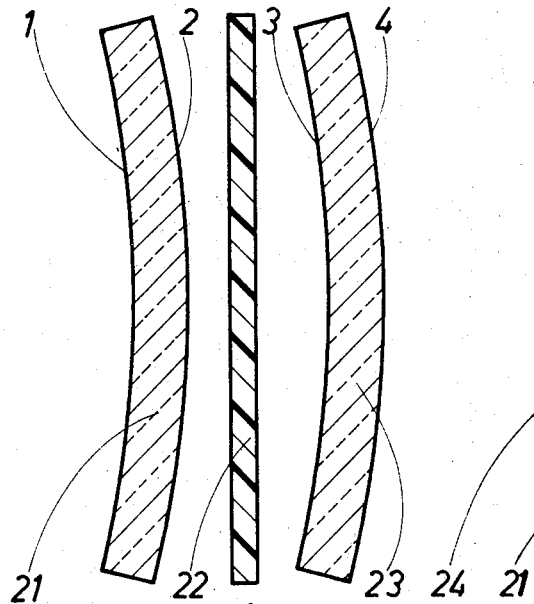
FIG. 12 is a cross-sectional view of the components of another embodiment of a panel according to the invention.

To form a panel composed of the sheets illustrated in FIG. 12, glass sheets 23 having a thickness of 3 mm. were formed from a glass having the following composition, by weight:

|  | Percent |
|---|---|
| $SiO_2$ | 70 |
| $Al_2O_3$ | 3 |
| $Na_2O$ | 12 |
| CaO | 14 | the remainder being constituted by small amounts of minor constituents, and vitrocrystalline sheets 21 having a thickness of 3 mm. were formed from a composition having the following components, by weight:

|  | Percent |
|---|---|
| $SiO_2$ | 65.5 |
| $Al_2O_3$ | 26 |
| $LiO_2$ | 4 |
| $TiO_2$ | 4.5 |

Sheets 21 and 23 had identical dimensions of 1 m. x 1 m. and, before assembly of the panel, were subjected to the following treatments:

(a) Sheets 23 were heated to a temperature at which the viscosity of their glass material was of the order of $10^8$ poises to as to permit them to be easily bent and so as to permit a rapid relaxation of the stresses induced by such bending. Each sheet 23 was then bent to have a simple curvature. On the other hand, vitrocrystalline sheets 21 were bent in a manner well-known per se, to also have a simple curvature. As a result of this bending, vitrocrystalline sheets 21 were curved to such an extent that their rise was 30 mm. while the corresponding rise of the sheets 23 was 15 mm.;

(b) Sheets 23 were then chemically tempered by immersing them for 24 hours in a bath of $KNO_3$ maintained at a temperature of 450° C. while vitrocrystalline sheets 21 were not subjected to a chemical tempering treatment;

(c) After sheets 23 were removed from the tempering bath, and all of the sheets were washed and dried, each sheet 21 was disposed relative to sheet 23 in the manner illustrated in FIG. 12 and a 0.8 mm. thick sheet 22 of polyvinyl butyral was interposed between them. The three sheets were then joined together to form a laminate, with the result that sheet 21 was flexed in a direction to reduce its curvature, and thus to reduce compressive stresses in its face 2, while sheet 23 was flexed in a direction to increase its curvature and thus induce tensile stresses in its face 4. The resulting panel had a curvature somewhere between the natural curvatures of sheets 21 and 23. When such an assembly is to be utilized as a closure panel for a building or a workshop, the sheet 21 is maintained in a flexed state by sheet 23 and they should be mounted in such a manner that vitrocrystalline sheet 21 is disposed toward the interior of the enclosure.

It was determined that panels of this type presented a better resistance than known panels to impacts against the face 1, i.e. the face directed toward the interior of the enclosure.

Figure 13:
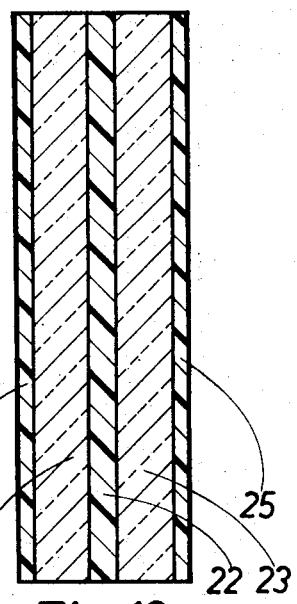
FIG. 13 is a cross-sectional view of the embodiment of a panel according to the invention made from the components of FIG. 12.

According to a modification of the procedure described above, a panel was assembled according to such procedure and the exterior faces of sheets 21 and 23 were provided with respective sheets 24 and 25 of 0.4 mm. thick polyvinyl butyral or polymethyl methacrylate, as shown in FIG. 13. The resulting panels were intended to be utilized as anti-explosive panels. It may be noted that FIG. 13 does not show the means whereby the laminate is held flat. In fact the laminate was held flat by means of a wall having an opening in which the panel was secured to form a fixed window. As an alternative, the panel could be held flat by means of a frame to form a structural unit ready for mounting as such in a wall opening or in some other position.

Example 7

Panels having the form illustrated in FIG. 15 were formed from two vitrocrystalline sheets 26 and 28, each having a thickness of 2 mm., the two sheets being joined together by a sheet 27 of a high molecular weight polyvinyl chloride and layers of a low molecular weight polyvinyl chloride serving as a component improving the adherence between the sheet 27 and sheets 26 and 28. Sheet 26 measured 1 m. x 1 m. x 2 mm. and sheet 28 measured 0.9 m. x 0.9 m. x 2 mm. In addition, each of the sheets 26 and 28 was formed from a vitrocrystalline material having the following composition, by weight:

|  | Percent |
|---|---|
| $SiO_2$ | 65.5 |
| $Al_2O_3$ | 26 |
| $Li_2O$ | 4 |
| $TiO_2$ | 4.5 |

Before assembly, sheets 26 and 28 had been bent in a manner known per se, so that each had a curvature such that its rise was 40 mm.

For the assembly, sheets 26 and 28 were disposed relative to one another in the manner illustrated in FIG. 14 and after these sheets were joined to sheet 27, the resulting assembly was disposed in a metal frame 29 in the manner illustrated in FIG. 15, sheets 26 and 28 then being held in a flexed condition in such a manner as to give them a planar configuration and to induce compressive stresses in faces 2 and 3 and tensile stresses in faces 1 and 4, frame 29 holding them in this configuration.

A group of such panels were subjected to tests of their resistance to impact by a rounded mass against their faces 1 and 4 and these tests revealed that the energy of an impact capable of breaking the panels was greater for these panels than for comparable panels which were identical except for the fact that their sheets corresponding to sheets 26 and 28 were naturally flat before assembly.

It will be understood that the above description of the present invention is susceptible to various modifications, changes and adaptations, and the same are intended to be comprehended within the meaning and range of equivalents of the appended claims.

I claim:

1. A method of making a panel from a plurality of sheets including a first sheet of glass or vitrocrystalline material, and a further sheet of a material selected from the group consisting of plastic, glass, and vitrocrystalline material, comprising the steps of:

(a) mechanically bending said sheets to place them in a state of elastic flexure in a direction to induce compressive stress in one face of each said sheet and tend to induce tensile stress in the other face of each said sheet;

(b) maintaining said sheets in such state; and (c) mechanically securing said sheets in a condition in which said sheets are held in such flexed state in mating configuration, with said one face of said first sheet directed toward said other face of said further sheet, such securing being produced solely by a frame surrounding said sheets.

2. A method as defined in claim 1, wherein said first sheet is held elastically flexed in a curved condition such that said compressed face is concave.

3. A method as defined in claim 1, wherein said first sheet is held elastically flexed in a plurality of planes.

4. A method as defiend in claim 1, wherein said first sheet is held elastically flexed in a single plane.

5. A method as defined in claim 1, further comprising treating said first sheet prior to assembly of said plurality of sheets to produce inherent compressive stresses in the internal layers of said first sheet of glass or vitrocrystalline material.

6. A method as defined in claim 5, wherein said step of treating produces substantially symmetrically inherent stresses in the external layers of glass or vitrocrystalline material adjacent the opposed faces of said sheet.

7. A method as defined in claim 5, wherein said treating of said first sheet is a chemical tempering treatment involving diffusion of ions into at least one face of said first sheet.

8. A method as defined in claim 7, wherein said chemical tempering treatment is one in which ions normally present in said first sheet are substituted by larger ions at a temperature insufficiently high to permit stress relaxation to occur in the sheet during the time of said chemical tempering treatment.

9. A method as defined in claim 7, wherein said chemical tempering treatment is one in which ions normally present in said first sheet are substituted by ions which confer a lower coefficient of thermal expansion on the external layers of glass or vitrocrystalline material, such substitution occurring at a temperature sufficiently high to permit stress relaxation to occur in the sheet.

10. A method as defined in claim 1, wherein said first sheet is located in said panel in such a manner that the other face of said first sheet faces away from said further sheet and constitutes a face of said laminate which is exposed to the environment.

11. A method as defined in claim 1, wherein said further sheet is located in said panel in such a manner that the face of said further sheet which is directed away from said first sheet constitutes a face of said laminate which is exposed to the environment.

12. A method as defined in claim 1 wherein said further sheet is of glass or vitrocrystalline material and further comprising subjecting said further sheet to a tempering treatment prior to said step of securing.

13. A method as defined in claim 12, wherein said tempering treatment is a chemical tempering treatment.

14. A method of making a panel from a plurality of sheets including a first sheet of glass or vitrocrystalline material, and a further sheet of a material selected from the group consisting of plastic, glass, and vitrocrystalline material, comprising the steps of:
 (a) mechanically bending said sheets to place them in a state of elastic flexure in a direction to induce compressive stress in one face of each said sheet and tend to induce tensile stress in the other face of each said sheet;
 (b) maintaining said sheet in such state; and
 (c) securing said further sheet to said first sheet to form a laminate in which said sheets are in mating configuration, with their one faces directed toward one another, and are each held in such state of elastic flexure by the other said sheet.

15. A method as defined in claim 14, wherein said panel further includes a frame and wherein said first sheet is maintained in said state of elastic flexure in part by said frame and in part by said further sheet.

16. A method as defined in claim 1, wherein said first sheet is naturally curved and is held in a state of reduced curvature.

17. A method as defined in claim 10, wherein said first sheet can, after being secured to said further sheet, be flexed to impose flexing forces on said further sheet sufficient to break said further sheet.

18. A method as defined in claim 17, wherein the relative resistances of said first and further sheets to breakage by flexure, are such that the resistance of said further sheet to breakage by flexure which imposes tensioning forces on the face thereof which is remote from said first sheet is higher than the resistance of said first sheet to breakage by flexure which imposes tensioning forces on the said compressed face of said first sheet.

19. A method as defined in claim 18, wherein said further sheet is of greater thickness than said first sheet so that said further sheet has a higher resistance to breakage than said first sheet.

20. A method as defined in claim 18, wherein said further sheet is subjected to a chemical tempering treatment so that said further sheet has a higher resistance to breakage than said first sheet.

21. A method as defined in claim 18, wherein said further sheet is of greater thickness than said first sheet and is subjected to a chemical tempering treatment so that said further sheet has a higher resistance to breakage than said first sheet.

22. A method as defined in claim 14, wherein said further sheet is held elastically flexed so that its face oriented away from said first sheet is in a state of tension.

23. A method as defined in claim 14, wherein said further sheet contains inherent compressive surface stresses and is held elastically flexed so that its face oriented away from said first sheet is in a state of reduced compression.

24. A method as defined in claim 14, wherein said further sheet is constituted by a sheet of glass or vitrocrystalline material and an organic sheet and said step of securing is carried out by joining said sheets of glass or vitrocrystalline material together by means of said organic sheet, said organic sheet then intervening between said sheets of glass or vitrocrystalline material.

25. A method as defined in claim 24, wherein said intervening organic sheet serves as such safety net in the event that said first sheet becomes broken by the impact of a body against said first sheet.

26. A method as defined in claim 14, wherein said first sheet is given a resistance to breakage under flexing forces tending to stretch said compressed face, such that a sample sheet measuring 30 cm. in each of its length and breadth dimensions but otherwise identical, when supported at the periphery of such face, in a horizontal position, will not break under the impact of a steel ball weighing 227 g. dropped from a height in meters equal to $1.5 + 0.95t$ where $t$ is the thickness of the sheet expressed in millimeters.

27. A method as defined in claim 26, wherein said first sheet is given a resistance to breakage under said flexing forces such that a sample sheet measuring 30 cm. in each of its length and breadth dimensions but otherwise identical, when subjected to said strength test, will not break under the impact of said ball when it is dropped from a height of 3.4 meters.

28. A panel formed as a laminate of a plurality of sheets comprising, in combination:
 (a) a first sheet of glass or vitrocrystalline material;
 (b) at least one further sheet of a material selected from the group consisting of plastic, glass, and vitrocrystalline material;
 (c) each of said sheets being mechanically bent into a state of elastic flexure in a direction to induce compressive stress in one face of each said sheet and tend to induce tensile stress in the other face of each said sheet, and said sheets being maintained in such state; and
 (d) frame means mechanically holding said sheets in a condition in which said sheets are held in such flexed state in mating configuration, with said one face of said first sheet directed toward said other face of said further sheet, said frame means constituting the sole means holding said sheets in such elastically flexed state.

29. A panel as defined in claim 28, wherein said compressed face of said first sheet is concave when in the flexed condition.

30. A panel as defined in claim 28, wherein said first sheet is held elastically flexed in a plurality of planes.

31. A panel as defined in claim 28, wherein said first sheet is held elastically flexed in a single plane.

32. A panel as defined in claim 28, wherein the external layers of the glass or vitrocrystalline material in said first sheet have compressive stresses therein.

33. A panel as defined in claim 32, wherein said first sheet is tempered to produce said compressive stresses.

34. A panel as defined in claim 33, wherein said tempering is produced chemically.

35. A panel as defined in claim 28, wherein the other face of said first sheet faces away from said further sheet and constitutes a face of the laminate which is exposed to the environment.

36. A panel as defined in claim 28, wherein said panel includes said first sheet and only one further sheet, said further sheet being held to said compressed face of said first sheet by said frame means.

37. A panel as defined in claim 36, wherein the face of said further sheet which is directed away from said first sheet constitutes a face of said laminate which is exposed to the environment.

38. A panel as defined in claim 28 wherein said further sheet is of glass or vitrocrystalline material and wherein said further sheet is tempered.

39. A panel as defined in claim 38, wherein said tempering is produced chemically.

40. A panel as defined in claim 36, wherein said first sheet is thinner than said further sheet and said first sheet has 1.0 to 2.5 mm. whereas said further sheet has a thickness in the range 1.5 to 4 mm.

41. A panel as defined in claim 36, wherein said first sheet has a resistance to breakage under flexing forces tending to stretch said compressed face thereof such that a sample sheet measuring 30 cm. in each of its length and breadth dimensions but otherwise identical when supported at the periphery of said face in a horizontal position, will not break under the impact of a steel ball weighing 227 g. dropped from a height in meters equal to $1.5+0.95t$ where $t$ is the thickness of the sheet expressed in millimeters.

42. A panel as defined in claim 41, wherein said first sheet has a resistance to breakage under said flexing forces such that a sample sheet measuring 30 cm. in each of its length and breadth dimensions but otherwise identical, when subjected to a said strength test, will not break under the impact of said ball when it is dropped from a height of 3.4 meters.

43. A panel as defined in claim 28, installed in a building or vehicle with said first sheet facing the interior of the building or vehicle.

44. A panel formed as a laminate of a plurality of sheets comprising, in combination:
 (a) a first sheet of glass or vitrocrystalline material;
 (b) at least one further sheet of a material selected from the group consisting of plastic, glass and vitrocrystalline material;
 (c) each of said sheets being mechanically bent into a state of elastic flexure in a direction to induce compressive stress in one face of each said sheet and tend to induce tensile stress in the other face of each said sheet, and said sheets being maintained in such state; and
 (d) means joining said sheets together to form a laminate in which said sheets are in mating configuration with their one faces directed toward one another, and are each held in such state of elastic flexure by the other said sheet.

45. A panel as defined in claim 44, wherein said compressed face of said first sheet is other than concave when in the flexed condition.

46. A panel as defined in claim 44, further comprising a frame and wherein said first sheet is held in said elastically flexed state in part by said frame and in part by said further sheet.

47. A panel as defined in claim 44, wherein said first sheet can be flexed to impose flexing forces on said further sheet sufficient to break said further sheet.

48. A panel as defined in claim 47, wherein the relative resistances of said first and further sheets to breakage by flexure are such that the resistance of said further sheet to breakage by flexure which imposes tensioning forces on the face thereof which is remote from said first sheet is higher than the resistance of said first sheet to breakage by flexure which imposes tensioning forces on said compressed face of said first sheet.

49. A panel as defined in claim 48, wherein said further sheet is chemically tempered and is thicker than said first sheet.

50. A panel as defined in claim 44, wherein said further sheet is held elastically flexed in a direction such that its face oriented away from said first sheet is in a state of tension.

51. A panel as defined in claim 44, wherein said further sheet contains inherent compressive surface stresses and is held elastically flexed so that its face oriented away from said first sheet is in a state of reduced compression.

52. A panel as defined in claim 44, wherein said at least one further sheet includes a second sheet of glass or vitrocrystalline material and an organic sheet and said first and second sheets are secured together by means of said organic sheet which serves as an intervening sheet.

53. A panel as defined in claim 52, wherein said organic sheet is a sheet of thermoplastic material.

54. A panel as defined in claim 53, wherein said organic sheet is of polyvinyl butyral.

References Cited
UNITED STATES PATENTS

| | | | |
|---|---|---|---|
| 3,625,792 | 12/1971 | Shaffer | 156—106 X |
| 3,453,161 | 7/1969 | Golightly | 156—102 |
| 3,282,772 | 11/1966 | Davis | 156—102 X |
| 3,396,075 | 8/1968 | Morris | 156—102 X |

ALFRED L. LEAVITT, Primary Examiner

D. A. SIMMONS, Assistant Examiner

U.S. Cl. X.R.

156—102, 106, 160, 196, 306, 309; 161—45, 192, 199